United States Patent
Okuma

(10) Patent No.: US 9,688,124 B1
(45) Date of Patent: Jun. 27, 2017

(54) SLIDING DOOR APPARATUS

(71) Applicant: AISIN TECHNICAL CENTER OF AMERICA, INC., Northville, MI (US)

(72) Inventor: Emiko Okuma, Novi, MI (US)

(73) Assignee: AISIN TECHNICAL CENTER OR AMERICA, INC., Northville, MI (US)

( * ) Notice: Subject to any disclaimer, the term of this patent is extended or adjusted under 35 U.S.C. 154(b) by 0 days.

(21) Appl. No.: 14/971,613

(22) Filed: Dec. 16, 2015

(51) Int. Cl.
*E05F 11/00* (2006.01)
*B60J 5/04* (2006.01)
*B60J 5/06* (2006.01)

(52) U.S. Cl.
CPC ............... *B60J 5/0493* (2013.01); *B60J 5/06* (2013.01)

(58) Field of Classification Search
CPC .................................. B60J 5/06; B60J 5/0493
USPC .............................................. 49/360; 296/155
See application file for complete search history.

(56) References Cited

U.S. PATENT DOCUMENTS

| | | | | |
|---|---|---|---|---|
| 5,979,971 A * | 11/1999 | Mizuki | ............... | E05B 65/0811 292/219 |
| 6,412,222 B1 * | 7/2002 | Hashiba | ............... | B60J 5/06 296/155 |
| 6,477,806 B1 * | 11/2002 | Asada | ............... | E05D 15/101 296/146.2 |
| 6,513,285 B2 * | 2/2003 | Isomura | ............... | E05D 15/1047 49/349 |
| 6,848,216 B2 * | 2/2005 | Engelgau | ............... | E05B 81/13 49/352 |
| 6,966,148 B2 * | 11/2005 | Choi | ............... | E05F 11/483 296/155 |
| 7,288,907 B2 * | 10/2007 | Kamiya | ............... | B60J 5/06 296/146.2 |
| 8,069,611 B2 * | 12/2011 | Kitayama | ............... | E05F 5/003 49/26 |
| 8,245,447 B2 | 8/2012 | Oh | | |
| 8,282,156 B1 | 10/2012 | Thiele et al. | | |
| 2003/0116995 A1 * | 6/2003 | Yogo | ............... | B60J 5/06 296/155 |
| 2004/0189045 A1 * | 9/2004 | Yoshida | ............... | B60J 5/06 296/155 |
| 2004/0194385 A1 * | 10/2004 | Ichinose | ............... | E05F 5/003 49/26 |
| 2004/0256883 A1 * | 12/2004 | Ichinose | ............... | B60J 5/06 296/155 |
| 2006/0202507 A1 * | 9/2006 | Miyagawa | ............... | B60J 5/06 296/155 |
| 2007/0107313 A1 * | 5/2007 | Suzuki | ............... | E05F 15/41 49/360 |
| 2007/0138832 A1 * | 6/2007 | Kraus | ............... | B60J 1/17 296/155 |

* cited by examiner

*Primary Examiner* — Jerry Redman
(74) *Attorney, Agent, or Firm* — Oblon, McClelland, Maier & Neustadt, L.L.P.

(57) ABSTRACT

A safety apparatus for a sliding door of a vehicle, including a lower rail including a mid stopper bracket; and an arm affixed at an external extremity to the sliding door and connected at an internal extremity to the lower rail, the arm including a mid stopper lever that is rotatable. In an open position, the mid stopper lever contacts the mid stopper bracket and contacts a tongue of the internal extremity of the arm to prevent the sliding door from exceeding a mid open position.

7 Claims, 6 Drawing Sheets

US 9,688,124 B1

SLIDING DOOR APPARATUS

BACKGROUND

Field of the Disclosure

The present disclosure relates to a safety apparatus for a sliding door for a vehicle.

Description of the Related Art

The operation of a sliding door for a vehicle can be inconvenient for its user. For example, an object of the user, e.g. a bag, may be caught between the sliding door and the vehicle body. Such kinds of inconveniences are prone to happen when the sliding door has an open window through which the object of the user can be passed. Furthermore when the door is vigorously opened, the object caught between the open window and the body of the vehicle can be severely damaged.

In order to prevent such kinds of inconveniences from occurring safety apparatuses that are actuated by the opening of the window have been available.

Such available apparatuses are based on complex designs relying on open and large mechanisms operating long and protruding parts that can interfere with each other.

Though such apparatuses have achieved some success in preventing such kinds of inconveniences, they have numerous shortcomings.

Unfortunately, due to their complex and cumbersome designs, these apparatuses are prone to fail. Notably, these apparatuses may be easily deformed and rendered inoperative by stepping on them or slamming the sliding door too vigorously. The main elements of these apparatuses may not be well protected and exposed to external elements such as grease or dust and ends up not working properly. In addition, such apparatuses may be bulky and difficult to hide resulting in unpleasing appearance for the vehicle.

Thus, a safety apparatus for opening a sliding door of a vehicle solving the aforementioned problems of design complexity, reliability, compactness and aesthetic is desired.

SUMMARY

Accordingly, the object of the present disclosure is to provide a safety apparatus for a sliding door of a vehicle which overcomes the above-mentioned limitations.

The safety apparatus of the present disclosure ensures reliability, compactness and aesthetic due to a more integrated and directly operated mechanism. The apparatus of the present disclosure directly utilizes the support structure of the sliding door as a way to protect the main elements and functionalities of the apparatus. In addition, the apparatus of the present disclosure relies on a direct connection and a positioning between its main elements avoiding interferences and complexity.

In one non-limiting illustrative example, a safety apparatus for a sliding door of a vehicle includes a lower rail including a mid stopper bracket; and an arm affixed at an external extremity to the sliding door and connected at an internal extremity to the lower rail, the arm including a mid stopper lever that is rotatable. In an open position, the mid stopper lever contacts the mid stopper bracket and contacts a tongue of the internal extremity of the arm to prevent the sliding door from exceeding a mid open position.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION

Figure 1:
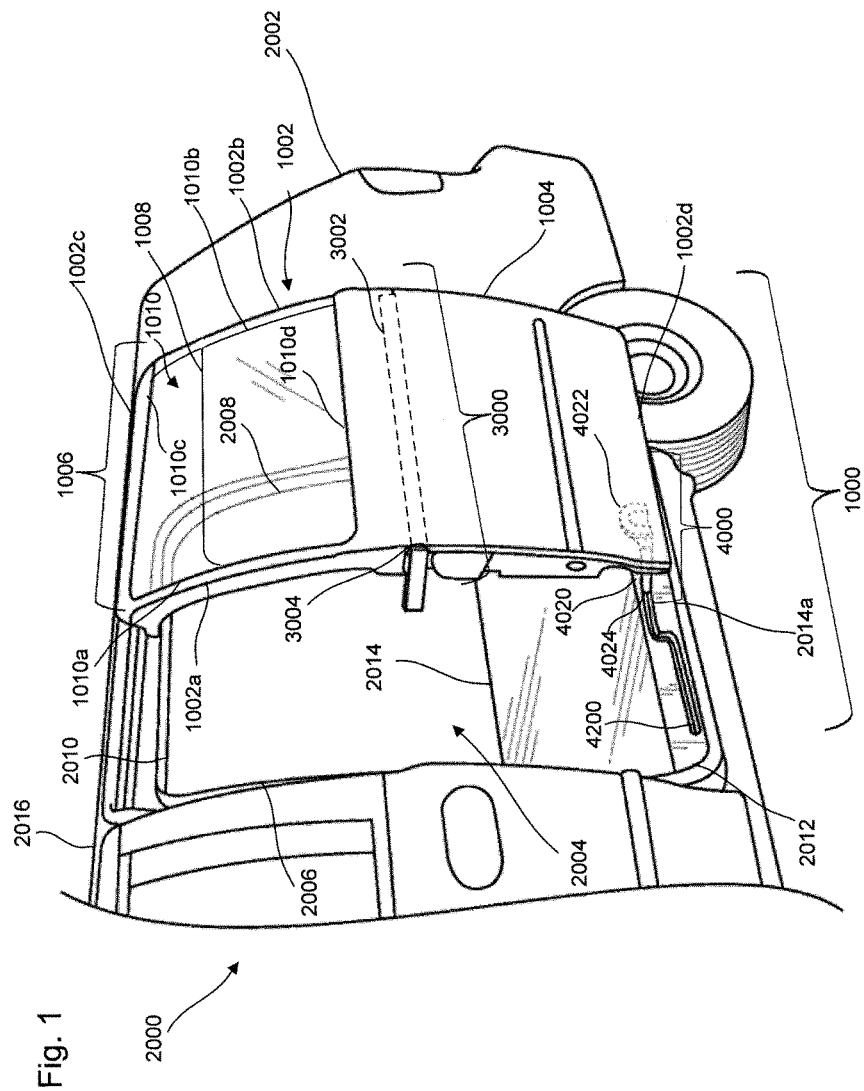
FIG. 1 is a perspective view of a sliding door assembly mounted within a side of a vehicle, according to certain aspects of the disclosure.

In the drawings, like reference numerals designate identical or corresponding parts throughout the several views. Further, as used herein, the words "a", "an" and the like generally carry a meaning of "one or more", unless stated otherwise. The drawings are generally drawn to scale unless specified otherwise or illustrating schematic structures or flowcharts.

Referring now to the drawings, wherein like reference numerals designate identical or corresponding parts throughout the several views.

FIG. 1 is a perspective view of a sliding door assembly 1000 mounted within a side 2002 of a vehicle 2000, according to certain aspects of the disclosure.

The side 2002 of the vehicle 2000 includes a floor 2014, a roof 2016 and an opening 2004 with a front edge 2006 opposite to a rear edge 2008 and a top edge 2010 opposite to bottom edge 2012. As used herein, the term "front" refers to the region of the vehicle 2000 closest to the front edge 2006, the term "rear" refers to the region of the vehicle 2000 closest to the rear edge 2008, the term "top" refers to the region of the vehicle 2000 closest to the top edge 2010, and the term "bottom" refers to the region of the vehicle 2000 closest to the bottom edge 2012.

The opening 2004 may be placed in the rear region of the side 2002, as illustrated in FIG. 1, or anywhere on the vehicle 2000 and have any size.

The sliding door assembly 1000 includes a sliding door 1002, a center rail assembly 3000 mounted on the side 2002 of the vehicle 2000 and affixed to the sliding door 1002 by the interior, and a lower roller assembly 4000 linking the bottom part of the sliding door 1002 to a lower rail 4200 mounted on the floor 2014 of the vehicle 2000.

The sliding door 1002 has a door front edge 1002a opposite to a door rear edge 1002b and a door top edge 1002c opposite to a door bottom edge 1002d. The sliding door 1002 includes a frame 1004, a door window 1006 with a door glass panel 1008 inserted into a door opening 1010. The door opening 1010 is characterized by front window edge 1010a opposite to rear window edge 1010b and a top window edge 1010c opposite to a bottom window edge 1010d. The door window 1006 is moveable from a closed position, where the glass panel 1008 is adjacent to the top window edge 1010c, to an open position, where the glass panel 1008 is separated from the top window edge 1010c.

The center rail assembly 3000 includes a center rail 3002 extending longitudinally along the side 2002 of the vehicle 2000 and from the rear edge 2008 of the opening 2004 as well as a center guide 3004 affixed to the rear of the sliding door 1002 on one end and inserted into the center rail 3002 on another end.

Figure 3:
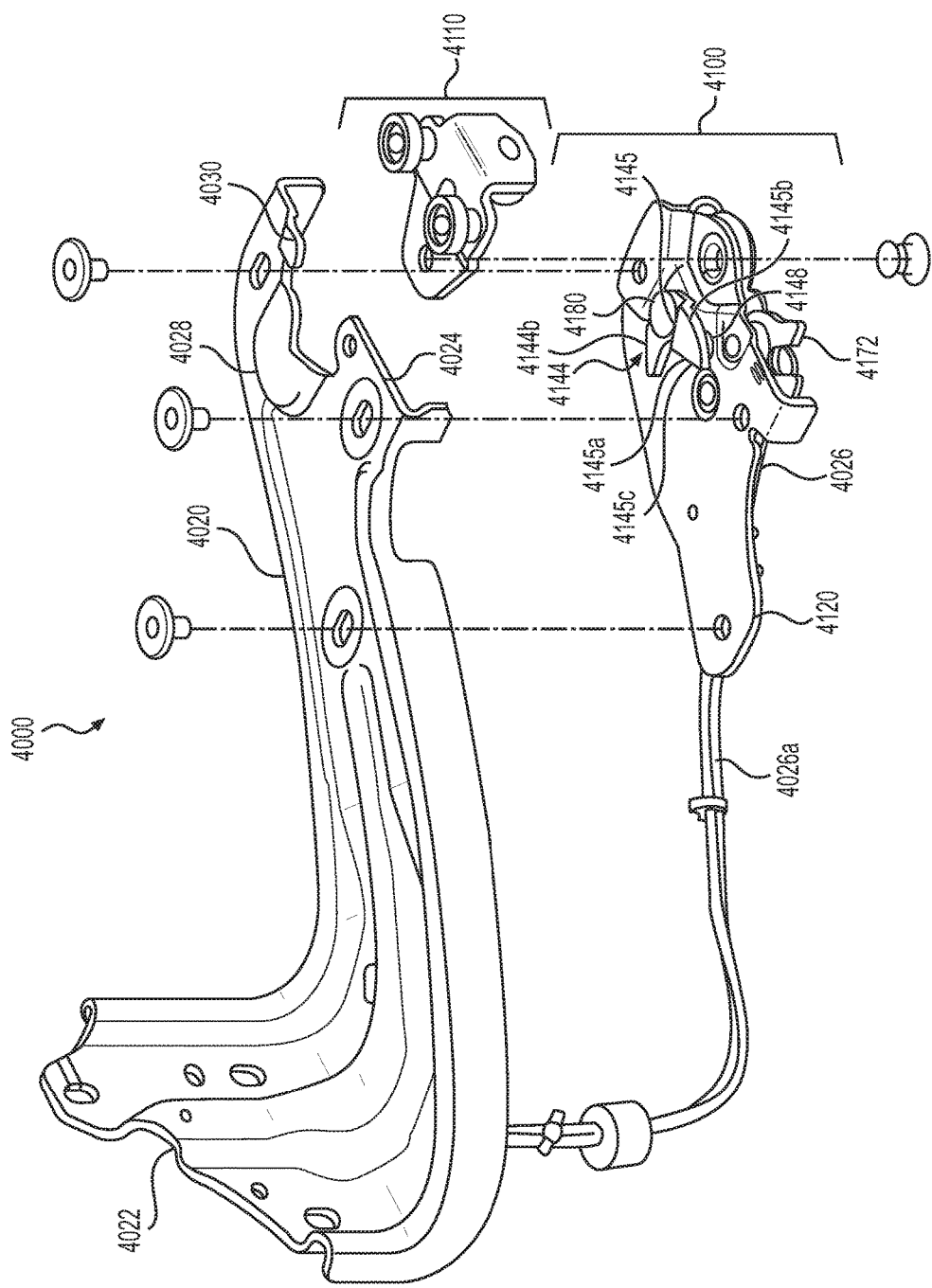
FIG. 3 is an exploded perspective view of the lower roller assembly, according to certain aspects of the disclosure.

The lower roller assembly 4000 includes an arm 4020 with an external extremity 4022 affixed to the sliding door 1002 and an internal extremity 4024 ended by a roller sub assembly 4100 with a roller guide 4110, see FIG. 3, inserted into the lower rail 4200.

The lower rail 4200 has an S-shape extending longitudinally on the floor 2014 of the vehicle 2000 between the front edge 2006 and the rear edge 2008 of the opening 2004. The rear part of the lower rail 4200 is delimited by a full stopper bracket 4202 ending the lower rail 4200, see FIG. 2A.

In addition, an upper floor 2014a may cover the internal extremity 4024 of the arm 4020 with the roller sub assembly 4100 and the lower rail 4200 to provide protection against the external elements, e.g., tar, grease, gravel, and hazards, e.g. unintentional stepping or hitting.

The center rail assembly 3000, the lower roller assembly 4000 and the lower rail 4200 enable the displacement of the sliding door 1002 along the side 2002 of the vehicle 2000. The center guide 3004 slides in the center rail 3002 while the roller sub assembly 4100 rolls in the lower rail 4200. The sliding motion of the sliding door 1002 may be performed by manual actions of a user or via motorized mechanical actions using electrical motors or hydraulic systems or by any other technique known by a person having ordinary skill in the art.

The sliding door 1002 may be displaced from a fully closed position, where the front window edge 1010a of the sliding door 1002 is affixed to the front edge 2006 of the vehicle 2000, to a fully open position, where the front window edge 1010a of the sliding door 1002 is placed adjacent to the rear edge 2008 of the vehicle 2000. The sliding door 1002 is maintained in the fully open position through a latch lever 4172 displaced by the latch mechanism 4170, see FIGS. 3A-3C, and hooked onto an anchor point of the side 2002.

When the door window 1006 is placed in the open position, the roller sub assembly 4100 is actuated to disable the fully open position of the sliding door 1002 and to block the sliding door 1002 in a mid open position, where a spacing between the rear edge 2008 of the opening 2004 and the front window edge 1010a of the side opening 1010 is maintained.

Blocking the sliding door 1002 in the mid open position prevents objects or body parts protruding through the door window 1006 from being caught between the rear edge 2008 of the opening 2004 and the front window edge 1010a of the door window 1006.

Figure 2A:
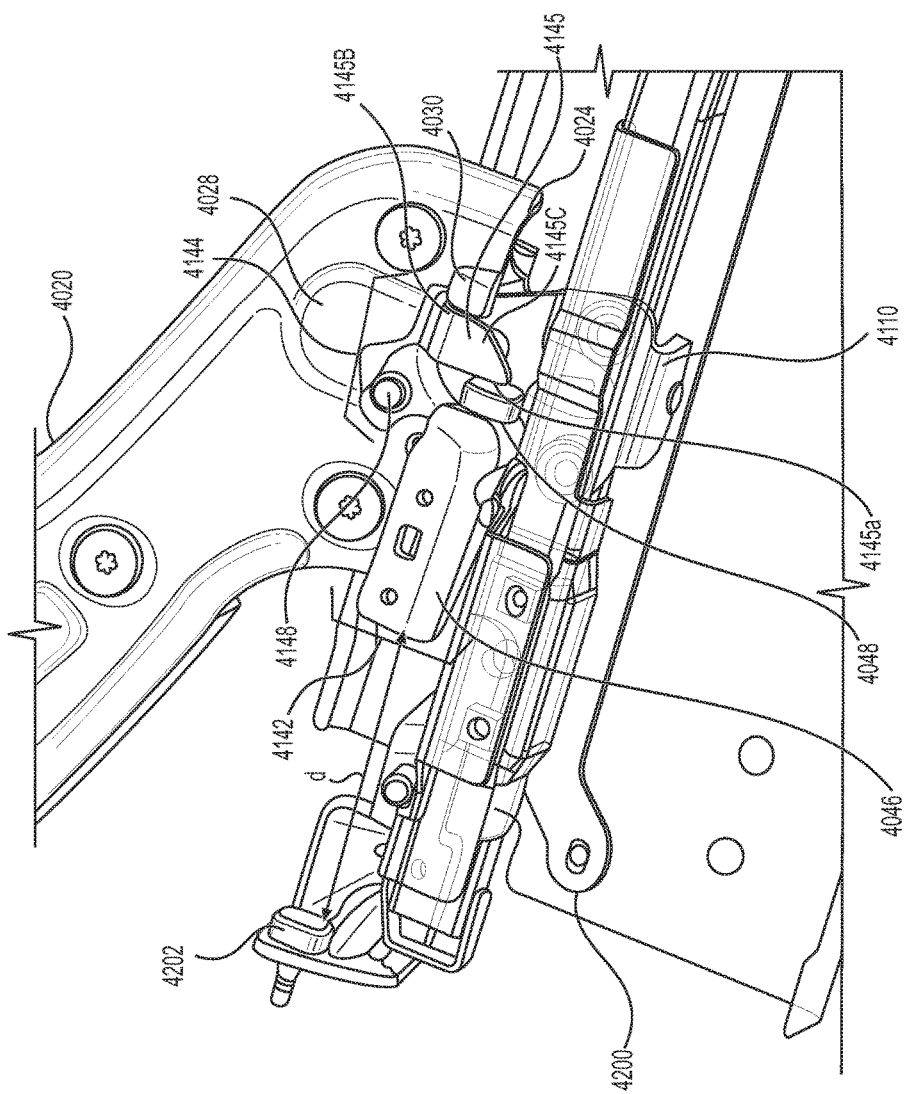
FIG. 2A is a perspective view of a lower roller assembly and a lower rail in a mid open position, according to certain aspects of the disclosure.
Figure 2B:
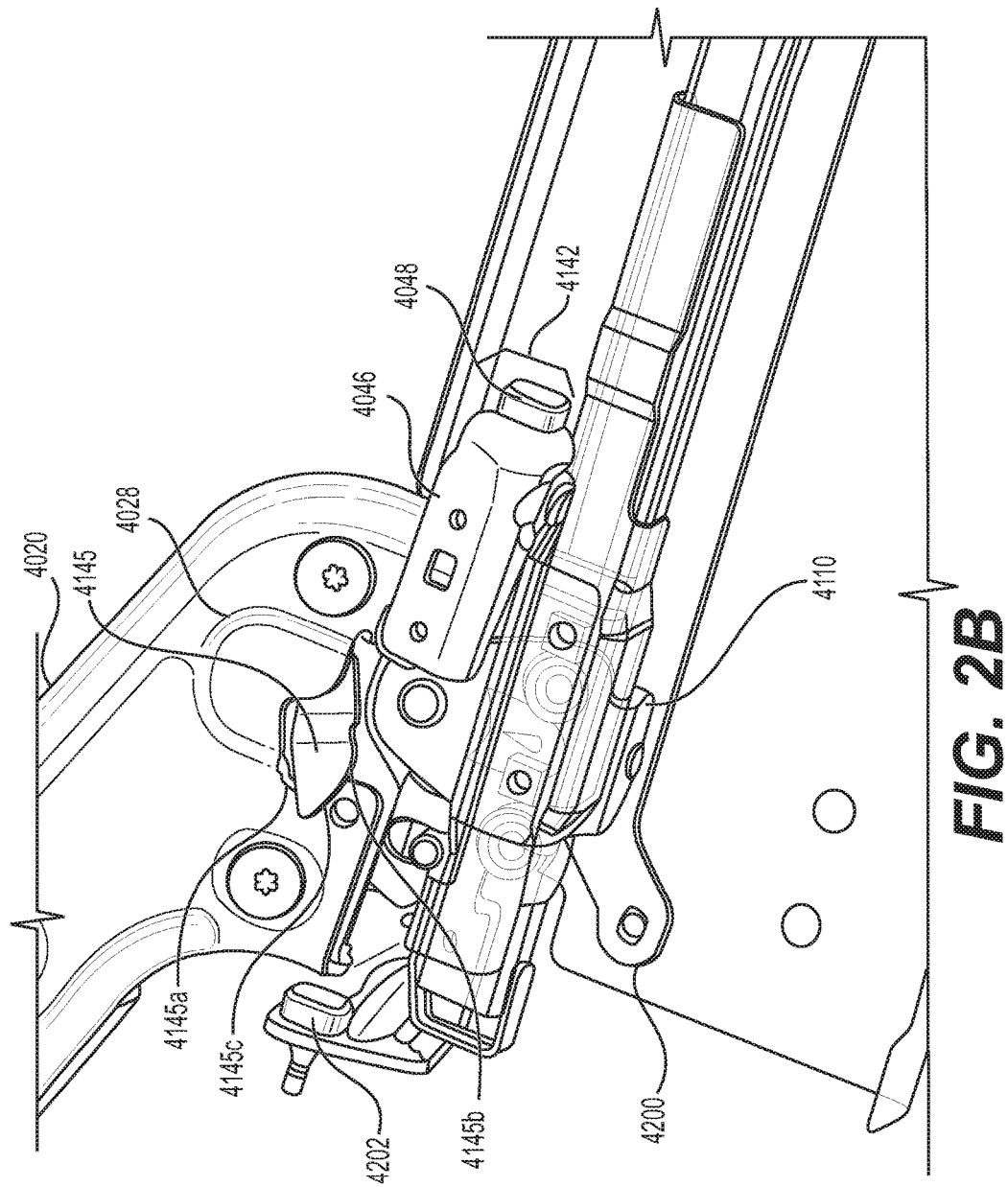
FIG. 2B is a perspective view of a lower roller assembly and a lower rail in a fully open position, according to certain aspects of the disclosure.

FIGS. 2A-2B are perspective views of the lower roller assembly 4000 and the lower rail 4200 in the mid open position and in the fully open position, respectively, according to certain aspects of the disclosure.

The lower roller assembly 4000 includes a mid stopper lever 4144 and a mid stopper bracket 4142 mounted on the lower rail 4200.

The mid stopper bracket 4142 is mounted on the lower rail 4200 or on the upper floor 2014a with a predetermined distance d from the full stopper bracket 4202, see FIG. 2A. The mid stopper bracket 4142 includes a body 4046 with half tubular shapes surmounted by a flat head 4048. The full stopper bracket 4202 may be molded or machined in one or several pieces assembled together and fastened onto the lower rail 4200 or onto the floor 2014 using fastening devices such as bolts, adhesives or the combination thereof.

The mid stopper lever 4144 may be formed by a plate having a crescent shape with a raised part 4145 and a lowered part 4144b. The raised part 4145 is characterized by a main flat part 4145a opposite to a minor flat part 4145b, and a curved part 4145c joining the major flat part 4145a and the minor flat part 4145c.

When the door window 1006 is moved from the closed position to the open position the mid stopper lever 4144 is rotated to an open position and when the door window 1006 is moved from the open position to the closed position the mid stopper lever 4144 is rotated back to a closed position.

The connection between the mid stopper lever 4144 and the door window 1006 may be electrical, mechanical or the combination thereof. For example, the rotation of the mid stopper lever 4144 may be actuated by a cable 4026 inserted into a cable housing 4026a actioned by a window regulator, wherein the window regulator controls the opening or closing of the door window 1006. The cable 4026 and the cable housing 4026a may be lodged into a groove of the arm 4020 for space saving purposes.

When the mid stopper lever 4144 is rotated in the open position, as illustrated in FIG. 2A, the raised part 4145 of the mid stopper lever 4144 protrudes over the internal extremity 4024 of the arm 4020 while the lowered part 4144b lies on a bumper 4148, e.g. a fixed pin circled with a rubber washer.

In addition, the minor flat part 4145b rests of the raised part 4145 of the mid stopper lever 4144 slightly touches a tongue 4030 formed by the internal extremity 4024 of the arm 4020. The raised part 4145 of the mid stopper lever 4144 protrudes such that the main flat part 4145a hits the flat head 4048 of the mid stopper bracket 4142 and prevents the arm 4020 from contacting the full open stopper bracket 4202. When the mid stopper lever 4144 hits the mid stopper bracket 4142, the sliding door 1002 is blocked in the mid open position and cannot be forced into the full open position. When the user tries to place the sliding door 1002 in the full open position the lowered part 4144b of the lever 4144 compresses the bumper 4148 and the raised part 4145 is pushed against the tongue 4030.

Since the arm 4020 is a strong and rigid structure, the tongue 4030 represents a robust blockage preventing the sliding door 1002 from being placed into the fully open position.

The predetermined distance d, see FIG. 2A, between the full stopper bracket 4202 and the mid stopper bracket 4142 is chosen such that a spacing between the rear edge 2008 of the opening 2004 and the front window edge 1010a of the window door 1006 is large enough to prevent an accident from occurring.

When the mid stopper lever 4144 is rotated back into the closed position, as illustrated in FIG. 2B, the main flat part 4145a of the raised part of the 4145 of the mid stopper lever 4144 is folded against the internal extremity 4024 of the arm 4020 and position on top of the bumper 4148. In the closed position, the mid stopper lever 4144 is no longer able to contact the mid stopper bracket 4142 and to prevent the arm 4020 from contacting the full open stopper bracket 4202. The arm 4020 passes over the mid stopper bracket 4142 and contact the full open stopper bracket 4202 to have the sliding door 1002 placed in the fully open position. In addition, the curved part 4145c of the raised part 4145 facilitates the passage of the arm 4020 over the mid stopper bracket 4142.

FIG. 3 is an exploded perspective view of the lower roller assembly 4000, according to certain aspects of the disclosure.

The lower roller assembly 4000 includes the arm 4020, the roller sub assembly 4100, and the roller guide 4110. The roller guide 4110 and the roller sub assembly 4100 are supported by a support plate 4120 affixed below the internal extremity 4024 of the arm 4020 through a plurality of bolts.

The mid stopper lever 4144 is affixed on top of the support plate 4120 via a D-shaped pin 4180, see detailed descriptions in the following paragraphs, while the latch mechanism 4170 is affixed below the support plate 4120. By not having the stopper lever 4144 and the latch lever 4172 in the vicinity of each other, interferences between the stopper lever 4144 and the latch lever 4172 are avoided, resulting in a more robust mechanism.

The mid stopper lever 4144 is covered in part by an embossment 4028 formed by the internal extremity 4024 of the arm 4020. The embossment 4028 protects the mid stopper lever 4144 and the D-shaped pin 4180. Since the arm 4020 is a strong and rigid structure, the embossment 4028 represents a robust protection for the mid stopper lever 4144 and the D-shaped pin 4180 against external stress loads such as stepping.

The spacing between the mid stopper lever 4144 and the latch mechanism 4170, as well as the embossment 4028, minimizes the thickness of the lower roller assembly 4000 and consequently minimizes the necessary distance between the floor 2014 and the upper floor 2014*a*. Minimizing the distance between the floor 2014 and the upper floor 2014*a* reduces the exposure of the internal extremity 4024 of the arm 4020, the roller sub assembly 4100, and the lower rail 4200 to external elements as well as to improve the aesthetics of the vehicle 2000.

Figure 4:
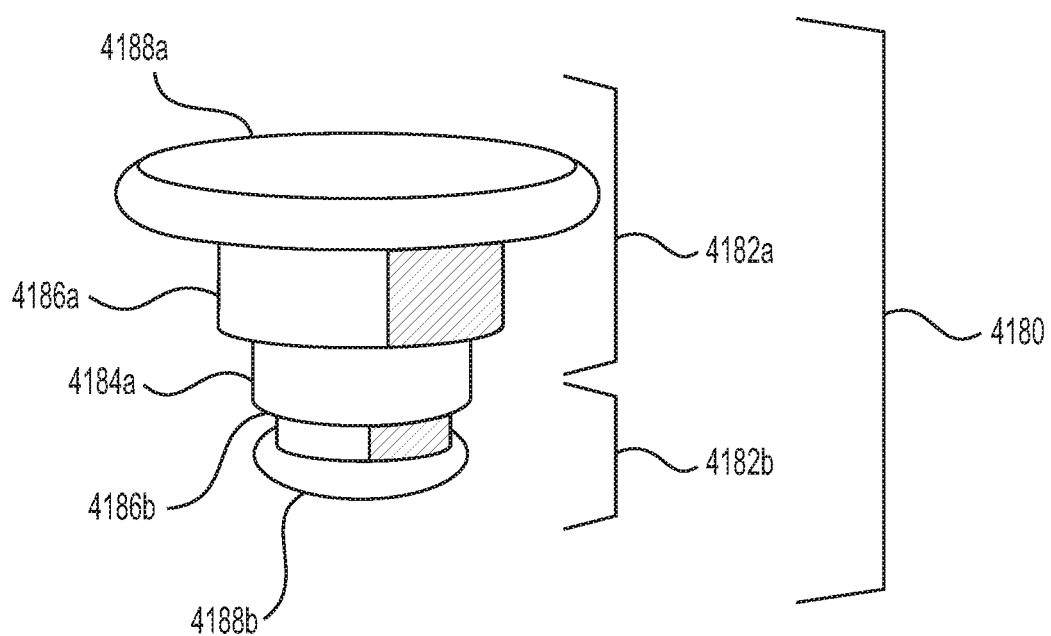
FIG. 4 is a perspective view of a D-shaped pin, according to certain aspects of the disclosure.
Figure 5:
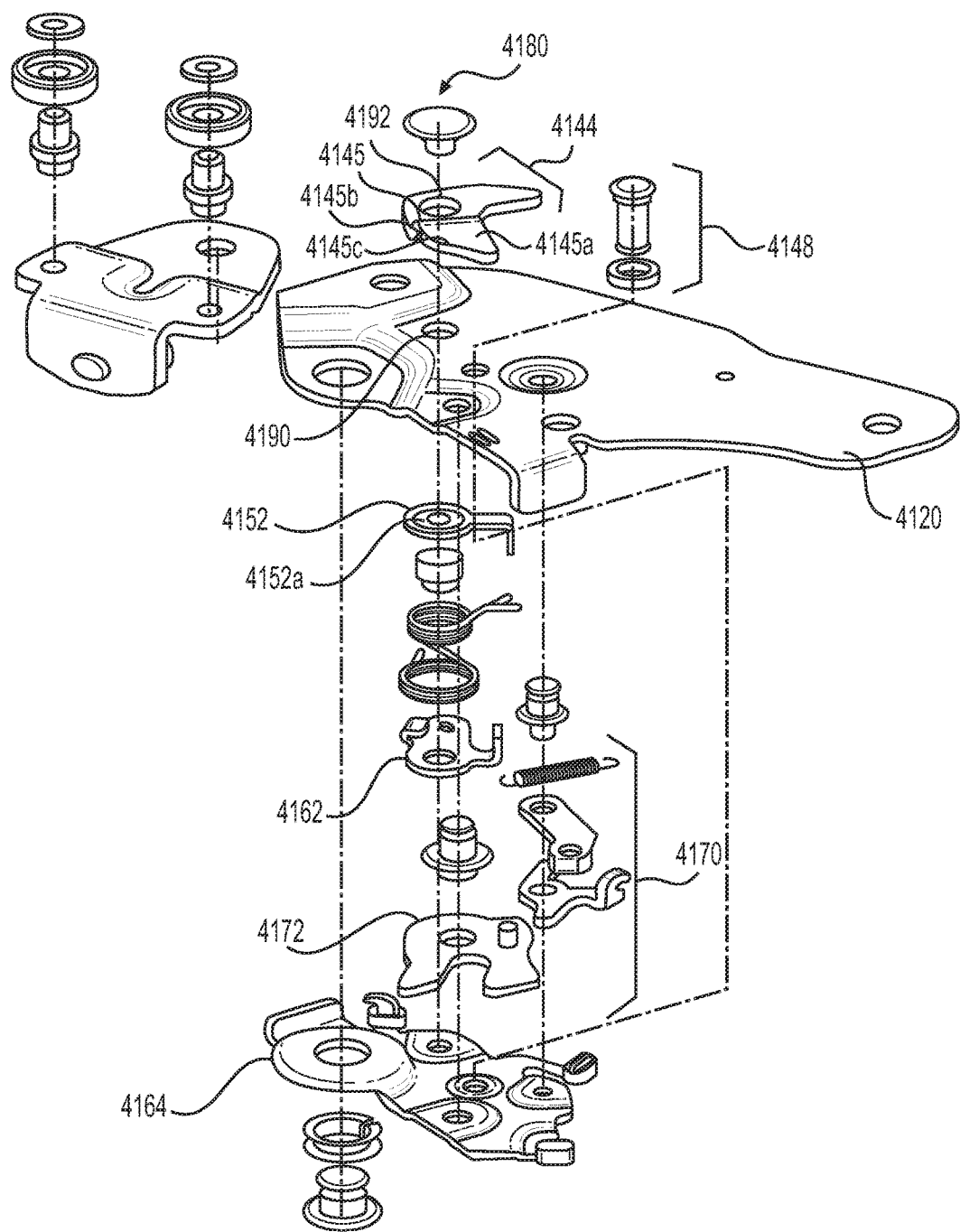
FIG. 5 is an exploded perspective view of a roller sub assembly, according to certain aspects of the disclosure.

FIGS. 4-5 are a perspective view of the D-shaped pin 4180 and an exploded perspective view of the roller sub assembly 4100, respectively, according to certain aspects of the disclosure.

The roller sub assembly 4100 includes the D-shaped pin 4180, an intermediate lever 4152 placed bellow the support plate 4120 and an trigger 4162 placed on a lower support plate 4164 localized below the support plate 4120.

The D-shaped pin 4180, the intermediate lever 4152 and the trigger 4162 are used to affix the mid stopper lever 4144 to the support plate 4120 and to articulate the mid stopper lever 4144 via the cable 4026, controlled by a window regulator.

The D-shaped pin 4180 enables to link the mid stopper lever 4144 with the intermediate lever 4152 in a direct fashion such that the intermediate lever 4152 rotates with the mid stopper lever 4144 around an axis z perpendicular to the support plate 4120. In other words, the D-shaped pin 4180 prevents the mid stopper lever 4144 and the intermediate lever 4152 from rotating independently.

The D-shaped pin 4180 may include a male body 4182*b* that can be inserted, e.g. by screwing, into a female body 4182*a*. The female body 4182*a* may include a waist 4184*a* with a circular cross section, a female D-shaped shoulder 4186*a*, e.g. a larger circular cross section that has been cut to form a flat part, or any non-circular cross section, and a head 4188*a*. The male body 4182*b* may include a male D-shaped shoulder 4186*b*, similar to the female D-shaped shoulder 4186*a*, surmounted by a male head 4188*b*.

The female waist 4184*a* may be inserted through a circular hole 4190 of the support plate 4120 while the female D-shaped shoulder 4186*a* may be inserted through a first D-shaped hole 4192 of the mid stopper lever 4144 with the female head 4188*a* resting on top of the mid stopper lever 4144. The first D-shaped hole 4192 has a shape and dimensions to tightly fit the female D-shaped shoulder 4186*a*.

The male D-shaped shoulder 4186*b* may be inserted through a second D-shape hole 4152*a* of the intermediate lever 4152 with the male head 4188*b* resting on the bottom of the intermediate lever 4152 while the male body 4182*b* may be inserted into the female waist 4184*a*. The second D-shaped hole 4152*a* has a shape and dimensions to fit tightly the male D-shaped shoulder 4186*b*.

Alternatively, the D-shaped pin 4180 may be any kind fastening devices preventing the mid stopper lever 4144 and the intermediate lever 4152 from rotating independently, such as a keyed joint, a flanged bolt with a lock nut, or any other devices known by someone having ordinary skills in the art.

By affixing the mid stopper lever 4144 and the intermediate lever 4152 to the support plate 4120 and by directly linking the mid stopper lever 4144 and the intermediate lever 4152 together, the D-shaped pin 4180 minimizes the number of elements, e.g. springs, holes, used to actuate the mid stopper lever 4144 and increase the robustness as well as compactness of the roller sub assembly 4100.

When the intermediate lever 4152 is rotated, the second D-shaped hole 4152 holds onto the male D-shaped shoulder 4186*b* and rotates the female waist 4184*a* inside the circular hole 4190 of the support plate 4120. The rotation of the female waist 4184*a* results in a rotation of the mid stopper lever 4144 via the connection between the female-shaped shoulder 4186*a* and the first D-shaped hole 4192.

When the door window 1006 is moved by the user from the closed position to the open position, the cable 4026 actuates the trigger 4162, the trigger 4162 engages the intermediate lever 4152 and forces the D-shaped pin 4180 to rotate and move the mid stopper lever 4144 from the closed position to the open position.

When the stopper lever 4144 is placed in the open position, the raised part 4145 of the mid stopper lever 4144 protrudes over the arm 4020 and leans on the tongue 4030 while the lowered part 4144*b* leans on the bumper 4148. The open position of the mid stopper lever 4144 prevents the sliding door 1002 from being placed into the fully open position by having the raised part 4145 of the mid stopper lever 4144 hitting the mid stopper bracket 4142 and blocking the sliding door 1002 into the mid open position.

When the door window 1006 is moved by the user from the open position to the closed position, the cable 4026 releases the trigger 4162, the trigger 4162 disengages the intermediate lever 4152 and forces, the D-shaped pin 4180 to rotate back the mid stopper lever 4144 from the open position to the closed position, under a bias force that may be generated by at least one spring.

When the stopper lever 4144 is placed in the closed position, the raised part 4144 is folded back against the internal extremity 4024 of the arm 4020 and is no longer able to hit the mid stopper bracket 4142 and to prevent the sliding door 1002 from being placed into the fully open position.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

What is claimed is:

1. A safety apparatus for a sliding door of a vehicle, comprising:
   a lower rail including a mid stopper bracket; and
   an arm affixed at a first end to the sliding door and connected at a second end to the lower rail, the arm including a mid stopper lever that is rotatable,
   wherein at a mid open position the mid stopper lever directly contacts the mid stopper bracket and directly contacts a tongue extending from an upper surface of the first end of the arm to prevent the sliding door from exceeding the mid open position that is between a full open position and a closed position.

2. The safety apparatus as claimed in claim 1, wherein the mid stopper lever includes a raised part that contacts the mid stopper bracket and the tongue when the mid stopper lever is rotated to the open position.

3. The safety apparatus as claimed in claim 2, wherein the raised part of the mid stopper lever includes:
   a first flat part that contacts the mid stopper bracket,
   a second flat part that contacts the tongue of the first end of the arm, the first and second flat parts being on opposite ends of the mid stopper lever, and
   a curved part that connects the first flat part to the second flat part and that facilitates passage of the first end of the arm over the mid stopper bracket.

4. The safety apparatus as claimed in claim 2, wherein in a closed position the mid stopper lever is rotated so as to not contact the mid stopper bracket to let the sliding door be placed in a fully open position, and
   where the raised part of the mid stopper lever is above a bumper when the mid stopper lever is placed in the closed position.

5. The safety apparatus as claimed in claim 1, wherein the mid stopper lever is affixed on top of a support plate via a pin and an intermediate lever is affixed on bottom of the support plate via the pin.

6. The safety apparatus as claimed in claim 5, wherein the pin includes:
   a non-circular female shoulder that inserts into a non-circular hole of the mid stopper lever,
   a circular female waist that inserts into a circular hole of the support plate, and
   a non-circular male shoulder that inserts into a non-circular hole of the intermediate lever and that inserts into the circular female waist.

7. The safety apparatus as claimed in claim 1, wherein the mid stopper bracket includes:
   a body configured to allow the first end of the arm pass without contact when the mid stopper lever is in a closed position and
   a flat head that contacts the mid stopper lever when the mid stopper lever is in the open position.

* * * * *